Feb. 14, 1939. E. H. SCHULTZ, JR 2,147,064
CASTER WHEEL BRAKE
Filed Dec. 27, 1937
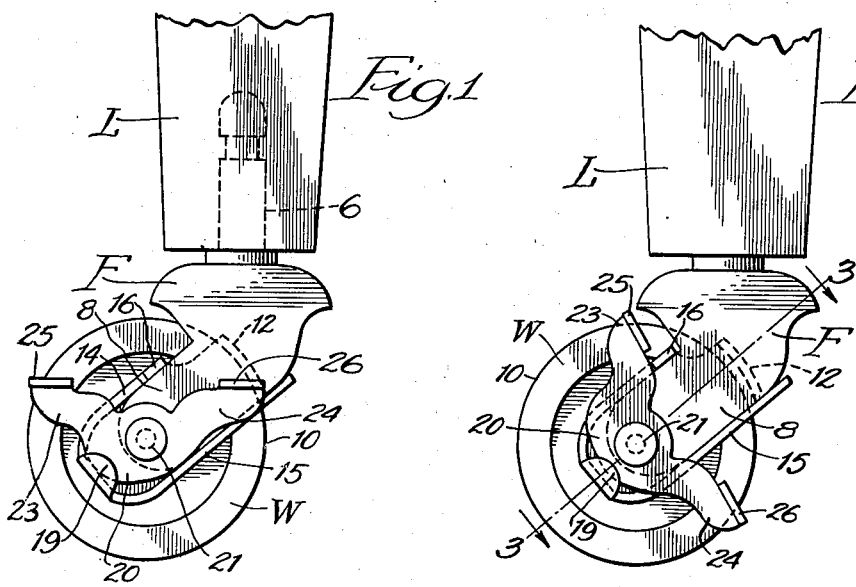
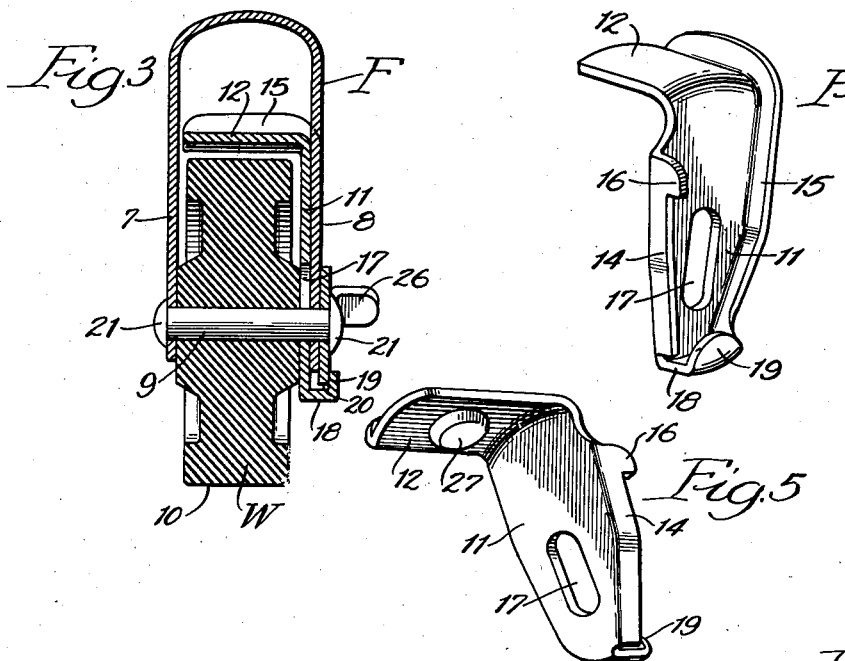
Inventor
Edward H. Schultz Jr.,
By Bunning & Bunning
Attorneys Patented Feb. 14, 1939

2,147,064

UNITED STATES PATENT OFFICE 2,147,064

CASTER WHEEL BRAKE

Edward H. Schultz, Jr., Chicago, Ill.

Application December 27, 1937, Serial No. 181,974

13 Claims. (Cl. 16—35)

This invention which relates to a caster wheel brake is concerned with a construction which is exceedingly effective, easy to operate, and inexpensive to produce.

There is need for a brake on a caster wheel, particularly when such a wheel is used to provide a movable support for light machinery. It is often important that the machine so equipped with caster wheels be locked against movement from a selected position. To accomplish this a brake is usually applied to one or more of the several caster wheels. Inasmuch as each such wheel is disposed substantially at the floor level where the brake is also located, it is somewhat of an effort to operate the brake, either on or off, unless this can be done by the foot. An important object of my invention is accordingly the provision of pedal means by which such a brake may be operated, either on or off, entirely by the foot without inconvenience or appreciable effort on the part of the user.

A suggestive embodiment of my invention is illustrated in the accompanying drawing wherein—

Figure 1 is a side elevation of a caster wheel together with the mounting therefor, showing incorporated therewith a simple form of pedal-operated brake in the "on" position;

Fig. 2 which is a similar view shows the brake in "off" position;

Fig. 3 is a transverse section through the wheel mounting and brake taken on line 3—3 of Fig. 2;

Fig. 4 is a view in perspective of the brake arm; and

Fig. 5 which is a similar view shows the reverse or inner side thereof.

Fitted into the lower end of a frame or stand leg L is a spindle 6 which upstands from the upper end of an arched supporting frame F comprising a pair of spaced depending arms 7 and 8 which may be extended obliquely, as shown best in Figs. 1 and 2. Between these arms is supported an axle pin 9 whereon is rotatably mounted a caster wheel W having a peripheral tread 10 which is adapted to be rolled along the floor.

Fitted between the wheel and one of the frame arms is a brake arm 11 one end 12 of which is laterally bent to provide a shoe which is adapted at times to engage with the tread of the wheel. The brake arm is flanged as at 14 and 15 along opposite edges thereof, these flanges extending outwardly to lie alongside of the opposite edges of the proximate frame arm 8. The flange 15 continues on around the bend to reinforce the shoe as well. Inasmuch as the brake arm and associated parts may be produced economically from sheet metal, this reinforcement afforded by the flange 15 may be desirable. The opposite flange 14, as shown, does not continue into the shoe portion, but terminates near the bend in a shoulder 16, the purpose of which will presently appear. Formed in the body of this brake arm is an elongated slot 17 extending lengthwise thereof.

When the present brake device is assembled with the caster wheel, the axle pin is extended through the wheel, through the slot 17 of the brake arm, and through registering apertures which are provided near the ends of the two frame arms 7 and 8. The end of the brake arm which lies proximate to the axle pin is flanged as at 18 and is provided further with a lip 19 which extends back for a short distance in a plane parallel with the arm itself. I thus provide in effect a short channel at the brake arm end which lies proximate to the axle pin. Fitted within this channel is a cam 20 which is formed on a lever of the first class which is also pivotally mounted on the axle pin 9. Opposite ends of the axle pin may be headed as at 21 whereby to secure the pin in place and maintain assembly therewith of the caster wheel, the supporting frame therefor, the brake arm, and the cam lever.

The cam lever is extended in opposite directions from its fulcrum point, i. e., the axle pin, to provide two substantially counterbalanced arms 23 and 24 carrying at their extremities outturned pedals 25 and 26 respectively. When the brake is in "on" position, as shown in Fig. 1, the two pedals lie about in a horizontal plane, whereas when the cam lever is rocked to the "off" position of Fig. 2, the pedal 25 is disposed above the opposite pedal 26. This is important in connection with foot operation of the brake as will now be explained.

In use the caster wheel may be locked in a given location by downward foot pressure upon the upper arm of the cam lever. This may be applied conveniently upon the pedal 25. When rocking from the position of Fig. 2 to that of Fig. 1, the cam 20 is moved within the channel to present increasingly higher portions of its surface against the end of the brake arm, thereby forcing the arm to move lengthwise of itself upon the arm 8 of the supporting frame. In executing this movement the two flanges 14 and 15, together with the slot 17 in which the axle pin is located, serve to guide the brake arm in a linear movement. The brake shoe is brought to a position of rest against the caster wheel tread where it remains by reason of a substantially dead center position of the cam. The brake will accordingly remain set for an indefinite period. To release, the opposite pedal 26 is pushed down, causing the cam to shift to a position of disengagement relative to the channeled end of the brake arm. Continued movement of the cam lever will bring the arm 23 thereof into engagement with the shoulder 16 whereby to produce a bodily movement of the brake arm opposite to that previously executed, with the result that the shoe end thereof is moved away from the caster wheel tread to a position of complete disengagement therefrom (see Figs. 2 and 3).

In the assembly of the several associated parts herein described, it is contemplated that the rocking lever will be prevented from loose movement in any appropriate way, as, for example, by utilizing for the caster wheel frame a spring metal which will normally exert a tendency to spread outwardly the two arms 7 and 8 toward the proximate axle pin ends with the result that the cam lever is held with pressure therebetween. By some such expedient the cam lever may be assured of remaining in the "off" position as shown in Fig. 2. If desired, a friction button 27 of rubber or the like (see Fig. 5) may be affixed to the under side of the shoe in position to engage the wheel tread when the brake arm is longitudinally shifted in response to operation of the cam lever. Such an expedient, if employed, will securely lock the caster wheel against rotary movement.

It will be noted that the two pedals normally lie in about a horizontal plane when the brake is in "on" position (see Fig. 1). To release, the pedal 26 is depressed with a consequent rocking of the lever, disengagement of the cam pressure, and, following a short idle movement, upward shifting of the brake arm. The pedal 25 is thereby elevated to an upper position convenient to receive pressure from the user's foot when the brake is to be operated once more.

I claim:

1. The combination with a supporting frame wherein is rotatably mounted a caster wheel, of a brake carried by the frame adjacent the wheel tread adapted to engage therewith, and a lever of the first class pivotally mounted on the frame, the lever being formed with a pedal on each end and with a cam engageable with the brake to advance the latter against the wheel tread when the lever is rocked in one direction, and means on the brake adapted to be engaged by the lever when it is rocked in the opposite direction whereby to disengage the brake from the wheel tread.

2. The combination with a supporting frame wherein is mounted an axle on which is a rotatable caster wheel, of an arm mounted to slide upon the frame radially of the wheel, one end of the arm being extended to lie adjacent the wheel tread to serve as a brake therefor, means for guiding the arm in its sliding movements upon the frame, the arm having a slot extending lengthwise of its direction of movement to receive therethrough the axle which is mounted in the supporting frame, the arm end opposite the brake being reversely bent to provide a channel, and an operating lever having a pivotal mounting coaxially with the axle and provided with a cam which is movably fitted within the channel of the arm adapted to engage therewith when the lever is rocked in one direction whereby to advance the arm radially of the wheel to cause engagement of the brake therewith.

3. The combination with a supporting frame wherein is a caster wheel, an arm mounted to slide upon the frame, a brake carried by the arm adjacent the wheel adapted to engage therewith or disengage therefrom, a rockable operating means on the frame having a cam connection with the arm adapted to advance the brake against the wheel, and an axle pin fixedly carried by the frame affording a support on which the wheel is freely rotatable, on which the brake arm is freely slidable, and on which the operating means is freely rockable.

4. The combination with a supporting frame wherein is rotatably mounted a caster wheel, of a brake carried by the frame adjacent the wheel tread adapted to engage therewith, an operating means movably mounted on the frame, a cam connection between the operating means and brake adapted to advance the brake against the wheel tread, and a second connection between the operating means and brake adapted to retract the brake away from the wheel tread.

5. The combination with a caster wheel, of a brake adjacent the wheel tread adapted to engage therewith, a movable operating means in connection with the brake adapted to hold the brake either against or away from the wheel tread, and a common mounting for the wheel, brake and operating means, including a tensioned support for the wheel adapted to exert a frictional pressure against the brake operating means while permitting free motion of the wheel and brake therefor.

6. The combination with a caster wheel, of a brake movable toward and from the wheel to engage therewith or disengage therefrom, an operating means for the brake, a cam connection between the operating means and brake adapted to advance and maintain the latter against the wheel, a lost motion connection between the operating means and the brake adapted to retract the latter away from the wheel, a common mounting for the wheel and brake, and a pivotal mounting for the operating means upon the mounting first named.

7. The combination with a supporting frame wherein is rotatably mounted a caster wheel, of a brake carried by the frame adjacent the wheel tread adapted to engage therewith, and a lever of the first class pivotally mounted on the frame, the lever being formed with a cam engageable with the brake to advance the latter against the wheel tread when the lever is rocked in one direction, and means on the brake adapted to be engaged by the lever when it is rocked in the opposite direction whereby to disengage the brake from the wheel tread.

8. The combination with a supporting frame wherein is mounted an axle on which is a rotatable caster wheel, of an arm mounted to slide upon the frame radially of the wheel, one end of the arm being extended to lie adjacent the wheel tread to serve as a brake therefor, means for guiding the arm in its sliding movements upon the frame, the arm having a slot extending lengthwise of its direction of movement to receive therethrough the axle which is mounted in the supporting frame, and an operating lever having a pivotal mounting coaxially with the axle and provided with a cam adapted to engage with the arm when the lever is rocked in one direction whereby to advance the arm radially of the wheel to cause engagement of the brake therewith.

9. The combination with a supporting frame wherein is fixedly carried an axle pin with a caster wheel rotatably mounted thereon, of a brake carried by the frame adjacent the wheel adapted to be shifted radially thereof for engagement with the wheel, and an operating lever movably mounted on the frame coaxially with the wheel axis having cam means engageable with the brake to shift it toward or from the wheel.

10. The combination with a supporting frame wherein is fixedly carried an axle pin with a caster wheel rotatably mounted therein, of an arm slotted to receive the axle pin for guidance thereby and mounted to slide thereupon radially of the wheel, one end of the arm being laterally bent to lie adjacent a circular surface of the wheel to serve as a brake therefor, and an operating means movably mounted on the frame having a cam connection with the arm adapted to advance the brake end thereof against the wheel.

11. The combination with a supporting frame wherein is fixedly carried an axle on which is a rotatable caster wheel, of an arm mounted to slide freely upon the frame radially of the wheel, a brake carried by the arm adjacent the wheel tread adapted to engage therewith or disengage therefrom, and an operating means pivotally mounted for rotation relative to the axle having a cam connection with the arm adapted to advance the brake against the tread.

12. The combination with a supporting frame wherein is fixedly mounted an axle on which is a rotatable caster wheel, a brake mounted to slide upon the frame radially of the wheel adapted to engage therewith or disengage therefrom and an operating means mounted for movements relative to the axle about a center which is coaxial with that of the caster wheel, and spaced connections between the operating means and brake adapted to advance or retract the latter relative to the wheel.

13. The combination with a supporting frame wherein is rotatably mounted a caster wheel, of an arm mounted to slide upon the frame radially of the wheel, a brake carried by the arm adjacent the wheel adapted to engage therewith, and an operating means movably mounted on the frame having spaced connections with the arm adapted, when moved in one direction, to advance the brake relative to the wheel and, when moved in the opposite direction, to proceed idly for a distance and then retract the brake from the wheel.

EDWARD H. SCHULTZ, Jr.